United States Patent
Helander et al.

(10) Patent No.: US 9,496,623 B2
(45) Date of Patent: Nov. 15, 2016

(54) DUAL BAND MULTI-LAYER DIPOLE ANTENNAS FOR WIRELESS ELECTRONIC DEVICES

(71) Applicant: Sony Corporation, Tokyo (JP)

(72) Inventors: Jakob Helander, Lund (SE); Zhinong Ying, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 77 days.

(21) Appl. No.: 14/549,574

(22) Filed: Nov. 21, 2014

(65) Prior Publication Data

US 2016/0149314 A1   May 26, 2016

(51) Int. Cl.
*H01Q 21/20* (2006.01)
*H01Q 9/06* (2006.01)
*H01Q 21/00* (2006.01)
*H01Q 9/28* (2006.01)
*H01Q 21/30* (2006.01)
*H01Q 5/48* (2015.01)

(52) U.S. Cl.
CPC ............... *H01Q 21/20* (2013.01); *H01Q 5/48* (2015.01); *H01Q 9/065* (2013.01); *H01Q 9/285* (2013.01); *H01Q 21/0075* (2013.01); *H01Q 21/30* (2013.01)

(58) Field of Classification Search
CPC .............................. H01Q 21/00; H01Q 21/20
USPC ......... 343/816, 810, 795, 700 MS, 702, 812, 343/813
See application file for complete search history.

(56) References Cited

U.S. PATENT DOCUMENTS

| 4,825,220 A | 4/1989 | Edward et al. |
| 5,274,391 A * | 12/1993 | Connolly ............... H01Q 21/10 343/789 |
| 5,532,708 A | 7/1996 | Krenz et al. |

(Continued)

FOREIGN PATENT DOCUMENTS

| EP | 1 687 867 A1 | 8/2006 |
| WO | WO 2005/053092 A1 | 6/2005 |

OTHER PUBLICATIONS

Chuang, Huey-Ru et al., 3-D FDTD Design Analysis of a 2.4-GHz Polarization-Diversity Printed Dipole Antenna with Integrated Balun and Polarization-Switching Circuit for WLAN and Wireless Communication Applications, *IEEE Transactions on Microwave Theory and Techniques*, vol. 51, No. 2, Feb. 2003.

(Continued)

*Primary Examiner* — Huedung Mancuso
(74) *Attorney, Agent, or Firm* — Myers Bigel, P.A.

(57) ABSTRACT

A wireless electronic device includes a printed circuit board (PCB) with first, second, and third conductive layers separated from one another by dielectric layers. A stripline is included in the first conductive layer. Two highband dipole antenna strips are included in the second conductive layer and/or two lowband dipole antenna strips are included in the third conductive layer. The wireless electronic device may be configured to resonate at a lowband resonant frequency corresponding to the two lowband dipole antenna strips and resonate at a highband resonant frequency corresponding to the two highband dipole antenna strips when excited by a signal transmitted and/or received though the stripline.

19 Claims, 7 Drawing Sheets

(56) References Cited

U.S. PATENT DOCUMENTS

| | | | | |
|---|---|---|---|---|
| 6,720,934 | B1* | 4/2004 | Price | H01Q 9/16 |
| | | | | 343/792 |
| 7,075,493 | B2* | 7/2006 | Azadegan | H01Q 13/10 |
| | | | | 343/767 |
| 7,619,578 | B2* | 11/2009 | Kanno | H01Q 1/38 |
| | | | | 343/700 MS |
| 7,701,407 | B2* | 4/2010 | Kanno | H01Q 13/106 |
| | | | | 343/767 |
| 8,368,602 | B2* | 2/2013 | Hill | H01Q 9/285 |
| | | | | 343/702 |
| 2004/0036655 | A1 | 2/2004 | Sainati et al. | |
| 2008/0030418 | A1 | 2/2008 | Brachat et al. | |
| 2008/0106478 | A1* | 5/2008 | Hill | H01Q 1/243 |
| | | | | 343/702 |
| 2010/0085262 | A1* | 4/2010 | Wolf | H01Q 3/24 |
| | | | | 343/768 |

OTHER PUBLICATIONS

International Search Report and Written Opinion Corresponding to International Application No. PCT/JP2015/002548; Date of Mailing: Aug. 20, 2015; 13 Pages.

* cited by examiner

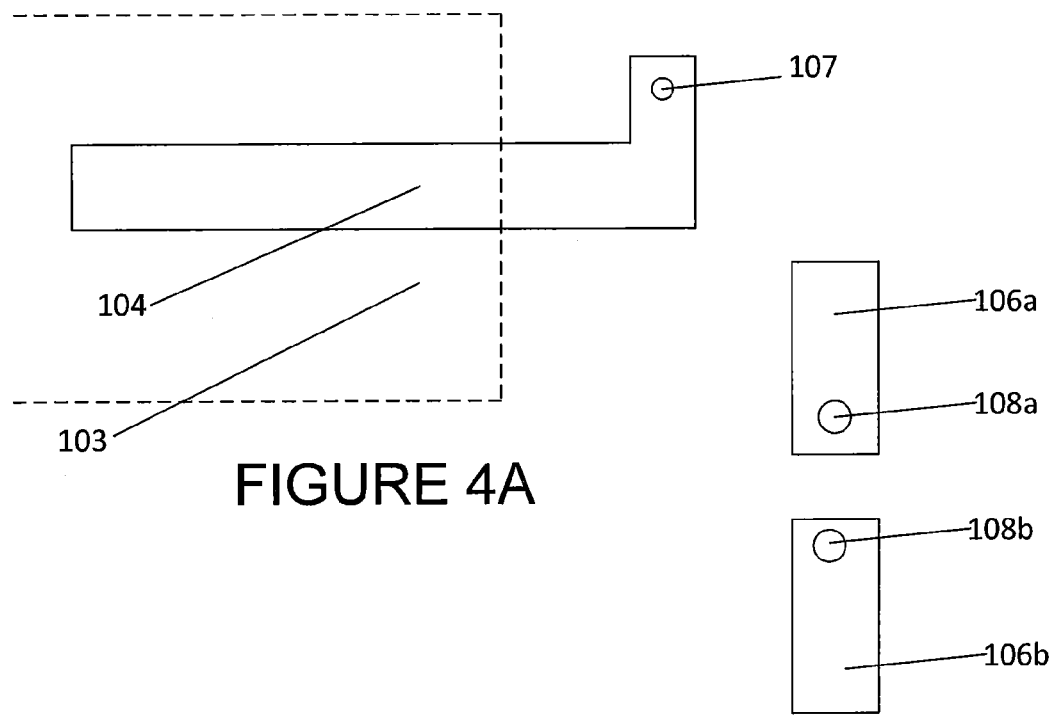
FIGURE 4A
FIGURE 4B
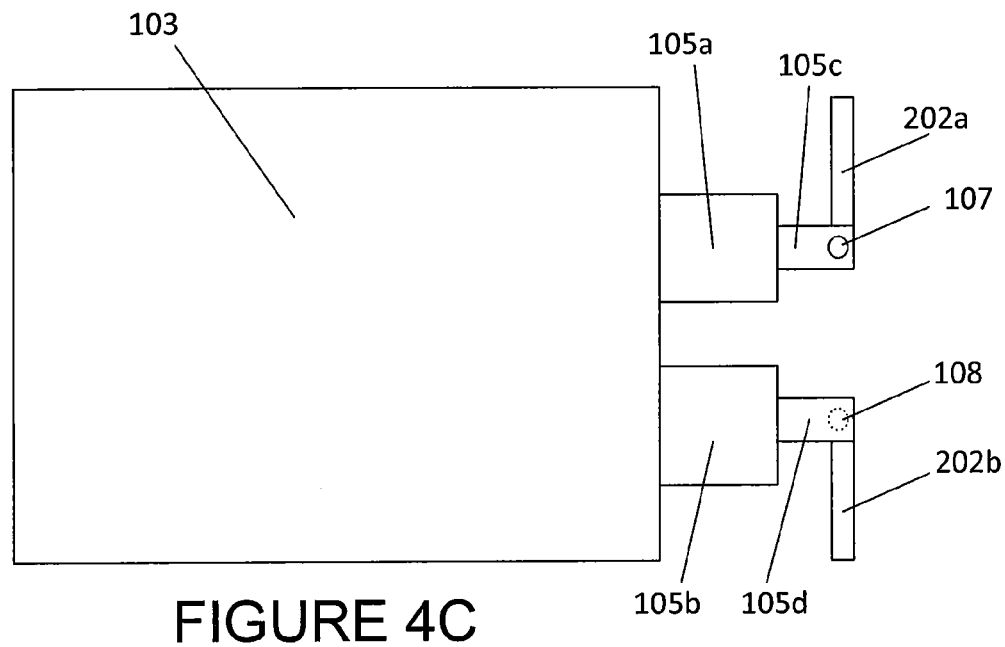
FIGURE 4C

DUAL BAND MULTI-LAYER DIPOLE ANTENNAS FOR WIRELESS ELECTRONIC DEVICES

TECHNICAL FIELD

The present inventive concepts generally relate to the field wireless communications and, more specifically, to antennas for wireless communication devices.

BACKGROUND

Communication devices such as cell phones and other user equipment may include antennas that can be used to communicate with external devices. These antennas designs may operate at multiple resonant frequencies. Some antenna designs, however, may not provide suitable performance of the antenna.

SUMMARY

Various embodiments of the present inventive concepts include a wireless electronic device including a printed circuit board (PCB) with first, second, and third conductive layers separated from one another by dielectric layers. A stripline may be included in the first conductive layer. Two highband dipole antenna strips may be included in the second conductive layer and/or two lowband dipole antenna strips may be included in the third conductive layer. The wireless electronic device may be configured to resonate at a lowband resonant frequency corresponding to the two lowband dipole antenna strips and response at a highband resonant frequency corresponding to the two highband dipole antenna strips when excited by a signal transmitted and/or received though the stripline. In some embodiments, the wireless electronic device may include a feeding via that electrically connects the stripline to at least one of the highband dipole antenna strips through the first dielectric layer.

According to some embodiments, the wireless electronic device may include a balun. The balun may include a ground plane and/or a current phase controlling element. The ground plane and the current phase controlling element may be in the second conductive layer. The current phase controlling element may include a first portion and a second portion with a slot therebetween. The width of the slot may control the phase of the current of the wireless electronic device.

According to some embodiments, the stripline may include a first portion and a second portion. The first portion of the stripline may be positioned to overlap the second portion of the current phase controlling element for electromagnetic coupling to form an electromagnetic radiation beam. In some embodiments, a feeding via may electrically connect the second portion of the stripline to at least one of the highband dipole antenna strips. In some embodiments, the wireless electronic device may include an antenna element via that electrically connects the current phase controlling element to at least one of the lowband dipole antenna strips through the second dielectric layer.

According to some embodiments, the two resonant frequencies of the wireless electronic device may include a lowband resonant frequency and a highband resonant frequency. The lowband dipole antenna strips may be configured to resonate at the lowband resonant frequency, and/or the highband dipole antenna strips may be configured to resonate at the highband resonant frequency. A length of one of the lowband dipole antenna strips may be approximately 0.25 wavelengths of the lowband frequency, and/or a length of one of the highband dipole antenna strips may be approximately 0.25 wavelengths of the highband resonant frequency. The stripline may be positioned to impedance match the balun. The width of the stripline may be based on a thickness of the first dielectric layer between the first and second conductive layers.

Various embodiments of the present inventive concepts include a wireless electronic device including a printed circuit board (PCB) with first, second, and third layers separated from one another by dielectric layers. The wireless electronic device may include a stripline in a first layer, a current phase controlling element in a second layer, two highband dipole antenna strips in the second layer and/or two lowband dipole antenna strips in a third layer. An antenna element via may extend from the current phase controlling element in the second layer to at least one of the lowband dipole antenna strips in the third layer. A feeding via may extend from the stripline in the first layer to at least one of the highband dipole antenna strips in the second layer.

Other devices and/or operations according to embodiments of the inventive concept will be or become apparent to one with skill in the art upon review of the following drawings and detailed description. It is intended that all such additional devices and/or operations be included within this description, be within the scope of the present inventive concept, and be protected by the accompanying claims. Moreover, it is intended that all embodiments disclosed herein can be implemented separately or combined in any way and/or combination.

BRIEF DESCRIPTION OF THE DRAWINGS

FIG. 4A illustrates a plan view of a first conductive layer of the dual band antenna of FIGS. 1A-3B, according to various embodiments of the present inventive concepts.

FIG. 4B illustrates a plan view of a third conductive layer of the dual band antenna of FIGS. 1A-3B, according to various embodiments of the present inventive concepts.

FIG. 4C illustrates a plan view of a second conductive layer of the dual band antenna of FIGS. 1A-3B, according to various embodiments of the present inventive concepts.

DETAILED DESCRIPTION

Figure 1A:
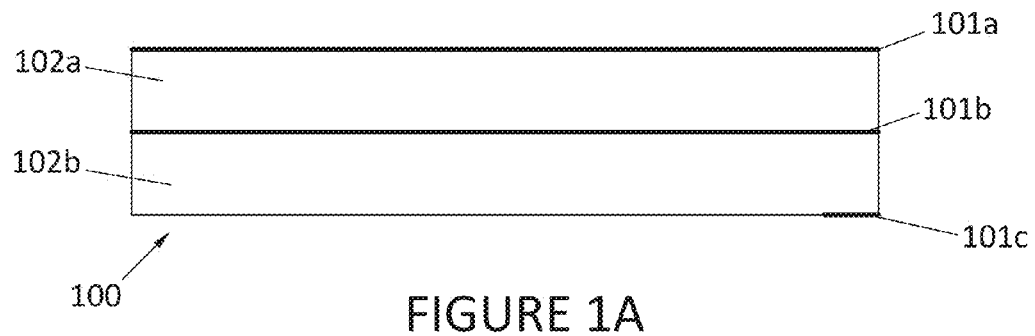
FIG. 1A illustrates a cross sectional view of a dual band antenna of a wireless electronic device, according to various embodiments of the present inventive concepts.

The present inventive concepts now will be described more fully with reference to the accompanying drawings, in which embodiments of the inventive concepts are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," (and variants thereof) when used herein, specify the presence of stated features, steps, operations, elements, and/or components, but do not preclude the presence or addition of one or more other features, steps, operations, elements, components, and/or groups thereof. In contrast, the term "consisting of" (and variants thereof) when used herein, specifies the stated features, integers, steps, operations, elements, and/or components, and precludes additional features, integers, steps, operations, elements and/or components.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly-formal sense unless expressly so defined herein.

Antennas are commonly used in microwave antenna designs for wireless electronic devices such as mobile terminals including smart phones and tablets. These antenna designs may be compact in size and easy to manufacture since they may be implemented as printed features on printed circuit boards (PCBs). Various wireless communication applications may use these printed antenna designs. However, a disadvantage of many printed antenna designs is that they achieve resonance at a single resonant frequency. Moreover, these single resonant antennas may narrow the radiation pattern into a beam that is directional and may require the device to be directed towards a base station. Furthermore, these single resonant frequency antennas may produce irregular radiation patterns that are not suitable for extremely high frequency (EHF) radio antenna applications such as millimeter wave antenna arrays for use in the 10 to 300 GHz frequency range. The extremely high frequencies may be used for various types of communication in smart phones such as broadband internet access, Wi-Fi, etc. It may be desired to build a single antenna with a dual band multilayer printed dipole with an integrated balun to achieve multiple resonant frequencies for use in multiple applications for mobile phones using multiple EHF resonant frequencies.

According to various embodiments of the present inventive concepts, a dual band printed antenna may be implemented using three conductive layers of a PCB to include a stripline, lowband antenna arms, and highband antenna arms on different layers of the PCB. The dual band antenna with three layers may exhibit good polarization characteristics with a broad radiation beam that is substantially symmetric with wide scanning angles at both lowband and highband frequencies.

Referring now to FIG. 1A, a side view of the wireless electronic device 100 is illustrated. The wireless electronic device 100 may include multiple conductive layers 101 separated by dielectric layers 102a and/or 102b. These conductive layers may include a suitable conductor such as copper. For example, wireless electronic device 100 may include a first conductive layer 101a, a second conductive layer 101b, and a third conductive layer 101c. The dielectric layers 102a and/or 102b may include a material with a high dielectric constant and a low dissipation factor tan δ. For example, a material such as Rogers RO4003C may be used as the dielectric layers 102, such that the dielectric constant $\in_r=3.55$ and the dissipation factor tan δ=0.0027 at 10 GHz.

Figure 1B:
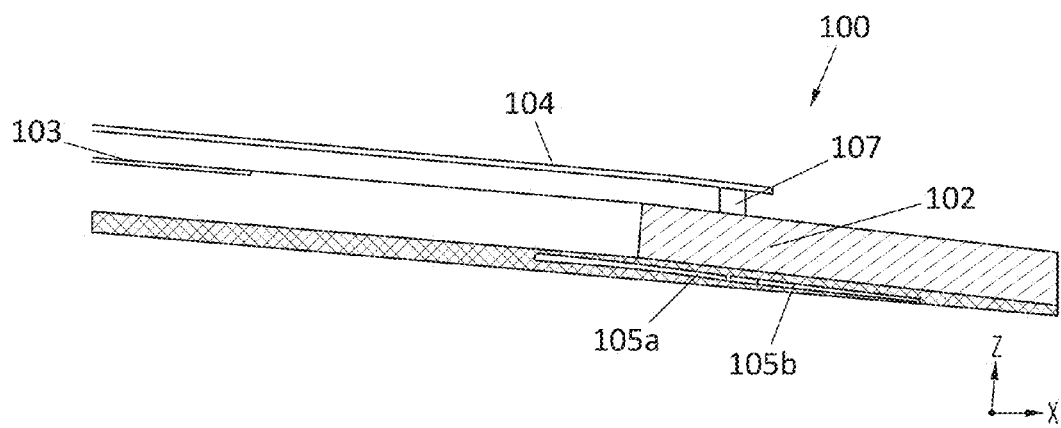
FIGS. 1B-1C illustrate cross sectional views of the dual band antenna of FIG. 1, according to various embodiments of the present inventive concepts.

Referring to FIG. 1B, a ground plane 103 may be included on at least a portion of the second conductive layer 101b. Dielectric layers 102a and/or 102b may be between various conductive layers. A feeding via 107 may extend through dielectric layer 102a and electrically connect a stripline 104 to the balun (not shown). A current phase controlling element 105 may include two portions 105a and 105b that are separated by a slot therebetween.

Figure 1C:
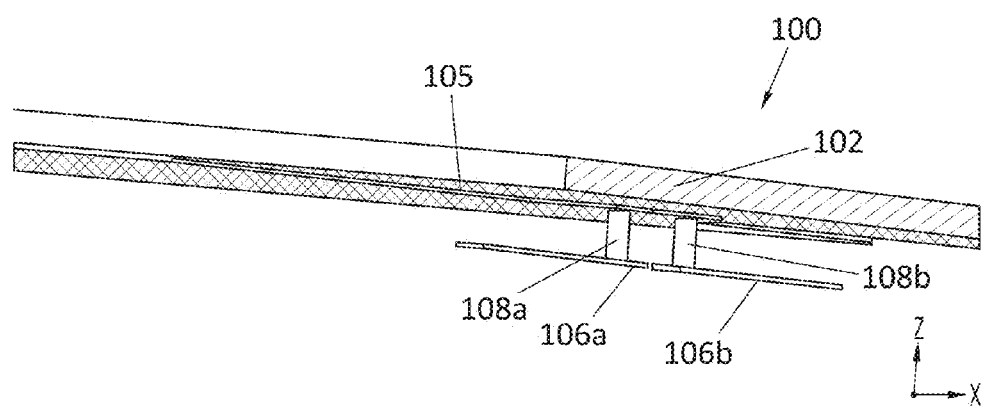

Referring to FIG. 1C, the wireless electronic device 100 may include one or more antenna element vias 108a and/or 108b that may electrically connect the current phase controlling element 105 to at least one or more lowband dipole antenna strips 106a and/or 106b through the second dielectric layer 102b.

Figure 2:
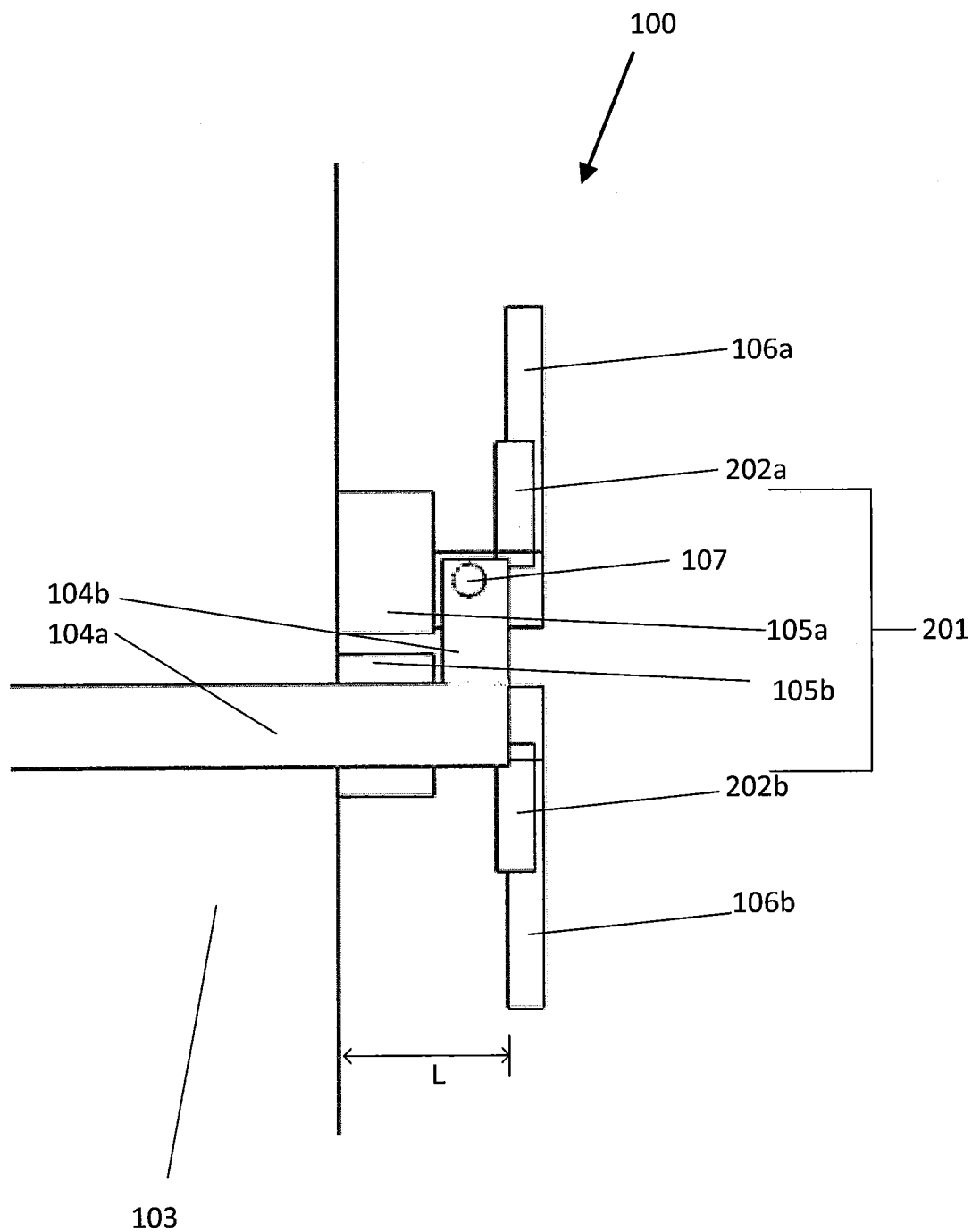
FIG. 2 illustrates a plan view of the dual band antenna of FIGS. 1A-1C, according to various embodiments of the present inventive concepts.

Referring to FIG. 2, in some embodiments, a portion 104b of the stripline 104 may be included in the balun 201. The stripline 104 may be connect by the feeding via 107 to one or more highband dipole antenna strips 202a and/or 202b. The stripline 104 may be in a different conductive layer from the ground plane 103. For example, the stripline 104 may be on a first conductive layer 101a and the ground plane 103 may be on a second conductive layer 101b. A balun structure 201 may include the ground plane 103, a current phase controlling element 105, and a feeding via 107. The current phase controlling element 105 may include a first portion 105a and a second portion 105b with a slot therebetween. The width of the slot, i.e. the distance between the first portion 105a and the second portion 105b of the current phase controlling element 105, may control the phase of the current of the wireless electronic device 100.

Still referring to FIG. 2, the wireless electronic device 100 may include lowband dipole antenna strips 106a and/or 106b. The wireless electronic device 100 may be configured to resonate at two resonant frequencies when excited by a signal transmitted and/or received through the stripline 104. The two resonant frequencies may include a lowband resonant frequency and/or a highband resonant frequency. The ground plane 103 may be spaced apart from the lowband dipole antenna strips 106a and/or 106b and/or spaced apart from the highband dipole antenna strips 202a and/or 202b by a length L. In some embodiments, the length L may be in the range of 0.125 wavelength to 0.5 wavelength of the lowband resonant frequency and/or a highband resonant frequency. In some embodiments, the length L may be approximately 0.25 wavelength of the lowband resonant frequency and/or a highband resonant frequency.

Figure 3A:
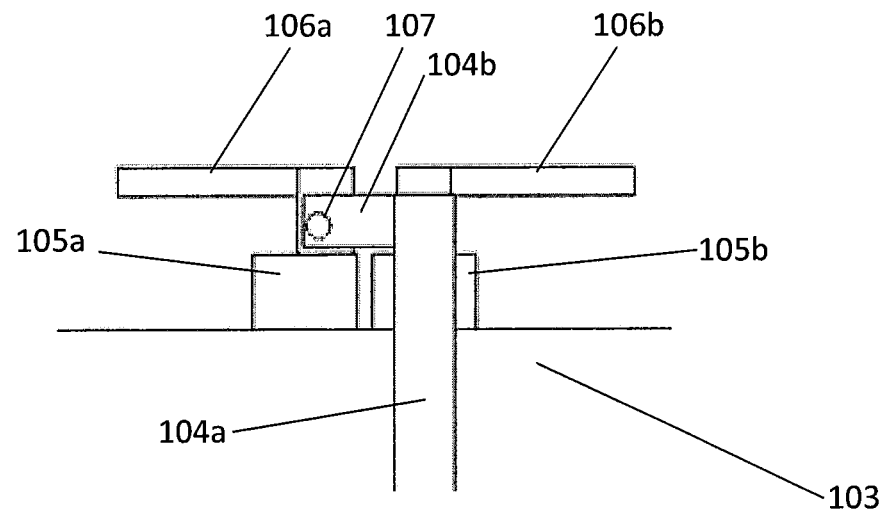
FIG. 3A illustrates a plan view of lowband dipole antenna strips of a dual band antenna of FIGS. 1A-2, according to various embodiments of the present inventive concepts.

Referring to FIG. 3A, the antenna of FIG. 2 with lowband dipole antenna strips 106a and/or 106b is illustrated. A first portion of the stripline 104a may overlap the second portion of the current phase controlling element 105b for electromagnetic coupling to form an electromagnetic radiation pattern. The thickness of the dielectric layer 102a of FIG. 1A may affect the selection of the width of the first portion of the stripline 104a. It may be desired for stripline 104 to be impedance matched to the balun 201 of FIG. 2. In some embodiments, the width of the stripline is based on a thickness of the first dielectric layer between the first and second conductive layers.

Still referring to FIG. 3A, the stripline 104 may be positioned to impedance match the balun 201. The first portion of the stripline 104a may overlap the second portion of the current phase controlling element 105b to produce electromagnetic coupling such that the lowband dipole antenna strips 106a and/or 106b resonate at a lowband resonant frequency. The lowband resonant frequency may be in the extremely high frequency (EHF) for radio antenna applications such as millimeter wave antennas for use in the 10 to 300 GHz frequency range. The length of one of the lowband dipole antenna strips 106a and/or 106b may be approximately 0.25 wavelengths of the lowband resonant frequency. In some embodiments, the length of one of the lowband dipole antenna strips 106a and/or 106b may be in the range of 0.125 wavelength to 0.5 wavelength of the lowband resonant frequency.

Figure 3B:
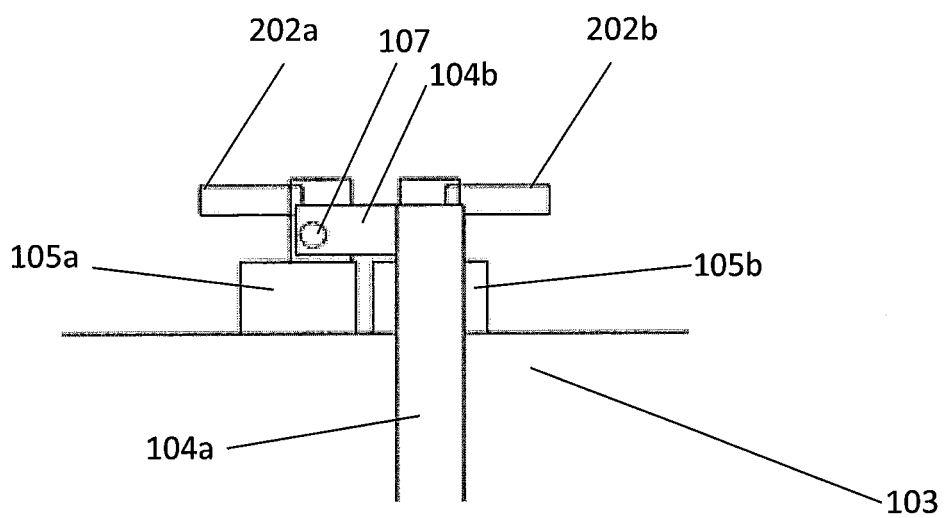
FIG. 3B illustrates a plan view of highband dipole antenna strips of a dual band antenna of FIGS. 1A-2, according to various embodiments of the present inventive concepts.

Referring to FIG. 3B, the antenna of FIG. 2 with highband dipole antenna strips 202a and/or 202b is illustrated. The feeding via 107 may electrically connect the stripline 104b with at least one of the highband dipole antenna strips 202a and/or 202b. The first portion of the stripline 104a may overlap the second portion of the current phase controlling element 105b to produce magnetic coupling such that the highband dipole antenna strips 202a and/or 202b resonate at a highband resonant frequency. The highband resonant frequency may be in the extremely high frequency (EHF) range of 10 to 300 GHz. The length of one of the highband dipole antenna strips 202a and/or 202b may be approximately 0.25 wavelengths of the highband resonant frequency. In some embodiments, the length of one of the highband dipole antenna strips 202a and/or 202b may be in the range of 0.125 wavelength to 0.5 wavelength of the highband resonant frequency.

Referring to FIG. 4A, a plan view of the first conductive layer 101a of FIG. 1A is illustrated. A stripline 104 may be included in layer 101a. A feeding via 107 may extend from the stripline 104 in the first conductive layer 101a to a highband dipole antenna strips 202a and/or 202b in the second conductive layer 101b. The dotted line marks an edge of the ground plane 103 in the second conductive layer 101b.

Referring to FIG. 4B, a plan view of the third conductive layer 101c of FIG. 1A is illustrated. In some embodiments, the third conductive layer 101c may be on the bottom of the wireless electronic device 100. In some embodiments, an antenna element via 108a and/or 108b may extend through dielectric layer 102b from the current phase controller element 105a and/or 105b in the second conductive layer 101b to the lowband dipole antenna strips 106a and/or 106b in the third conductive layer 101c. The antenna element via 108a and/or 108b may electrically connect the current phase controller element 105a and/or 105b with the lowband dipole antenna strips 106a and/or 106b.

Referring to FIG. 4C, a plan view of the second conductive layer 101b of FIG. 1A is illustrated. In some embodiments, the ground plane 103, the current phase controller elements 105a and 105b, and/or the highband dipole antenna strips 202a and/or 202b may be located in the second conductive layer 101b. A feeding via 107 may extend though dielectric layer 102a from the stripline 104 in the first conductive layer 101a to the highband dipole antenna strips 202a and/or 202b in the second conductive layer 101b. An antenna element via 108a and/or 108b may extend through dielectric layer 102b from the current phase controller 105a and/or 105b in the second conductive layer 101b to the lowband dipole antenna strips 106a and/or 106b in the third conductive layer 101c.

Figure 5A:
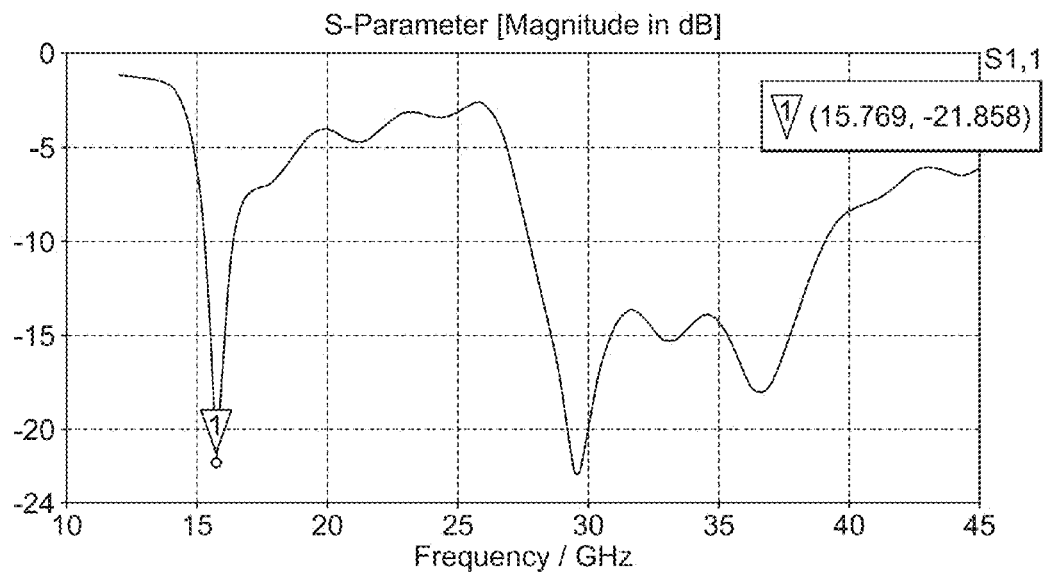
FIGS. 5A and 6A graphically illustrate the frequency response of the antenna of FIGS. 1A-4C, according to various embodiments of the present inventive concepts.

Referring to FIG. 5A, an example frequency response of the wireless electronic device 100 of FIGS. 1A-4C is illustrated. FIG. 5A graphically illustrates both a lowband resonant frequency and a highband resonant frequency. In this non-limiting example, the frequency response at point 1 has a lowband resonant frequency of approximately 16 GHz. The −10 dB bandwidth around this lowband resonant frequency may be 1100 MHz, which may be approximately 7.3% of the lowband resonant frequency. In other words, the frequency response around the lowband resonant frequency produces a wide bandwidth response around the lowband resonant frequency.

Figure 5B:
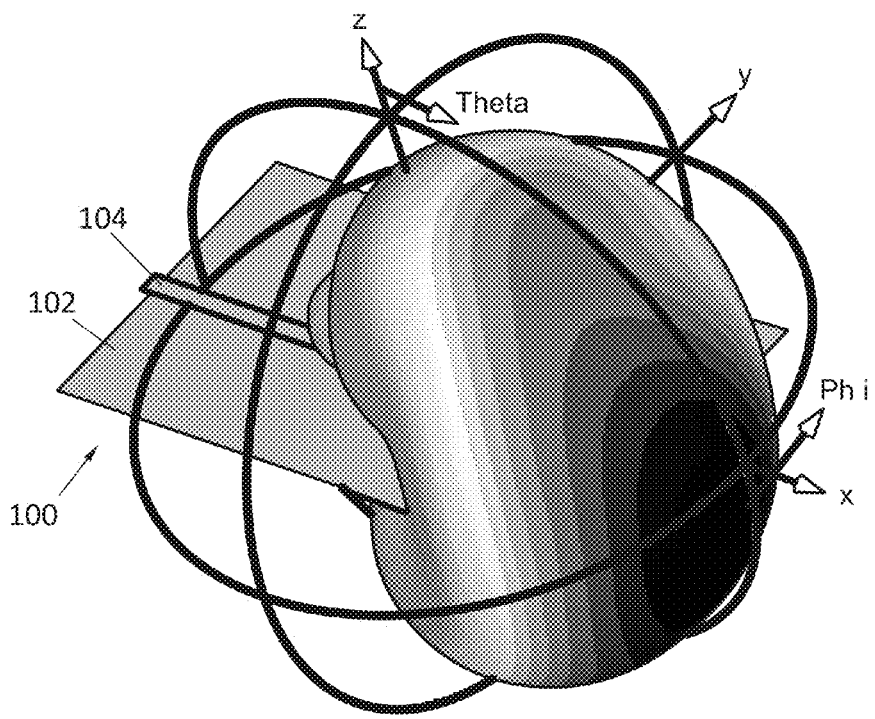
FIG. 5B illustrates the lowband radiation pattern for the antenna of FIGS. 2-4C, according to various embodiments of the present inventive concepts.

Referring to FIG. 5B, the radiation pattern for the antenna of FIGS. 1A-4C, is illustrated, with a lowband resonant frequency of approximately 16 GHz is illustrated. The radiation pattern around 16 GHz spans broadly and uniformly around the top edge of the device 100 with few prominent side lobes and little distortion.

Figure 6A:
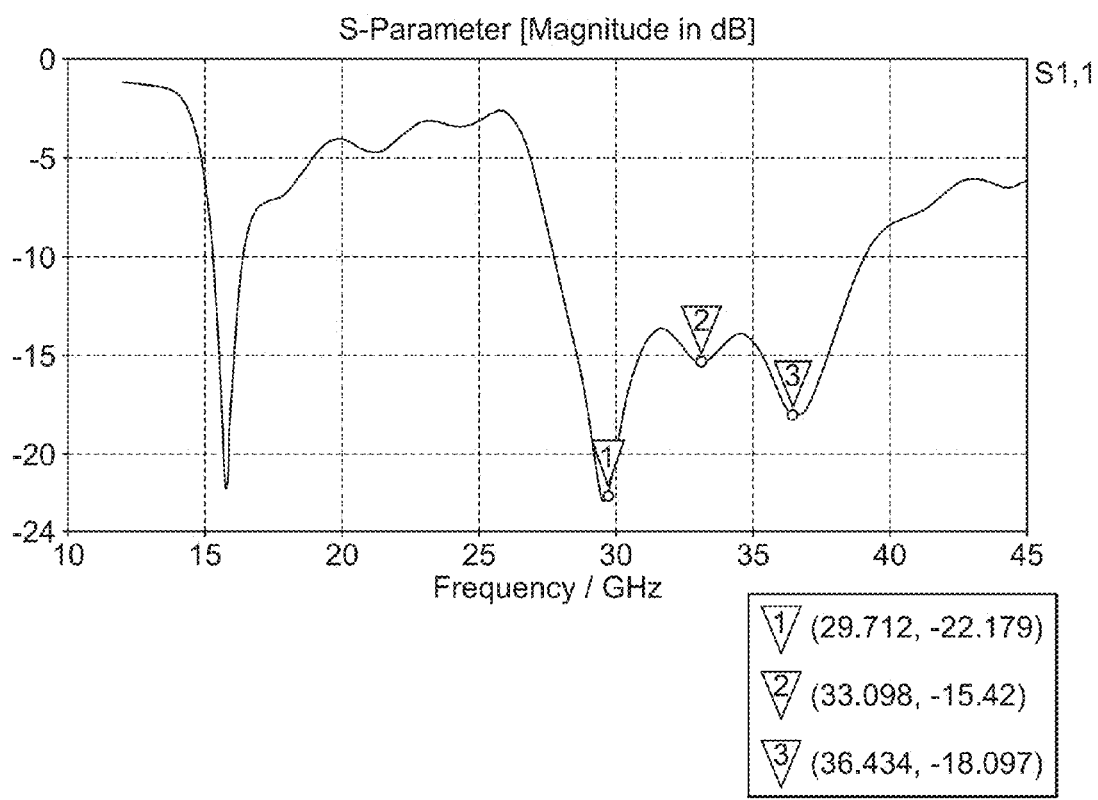

Referring to FIG. 6A, the frequency response of the antenna of FIGS. 1A-4C is illustrated. FIG. 6A graphically illustrates both a lowband resonant frequency and a highband resonant frequency. In this non-limiting example, the antenna of FIGS. 1A-4C is designed to have a highband resonant frequency response near 30 GHz. The −10 dB bandwidth around this lowband resonant frequency may be 11.5 GHz, which may be approximately 33% of the highband resonant frequency. This very wide bandwidth provided by this antenna around the highband resonant frequency offers excellent signal integrity with potential for use at several different frequencies in this bandwidth range.

Figure 6B:
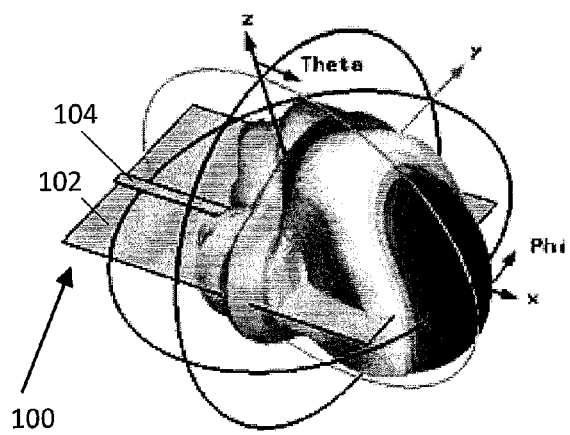
FIGS. 6B-6D illustrate the highband radiation pattern at points 1, 2, and 3 respectively of FIG. 6A according to various embodiments of the present inventive concepts.
Figure 6C:
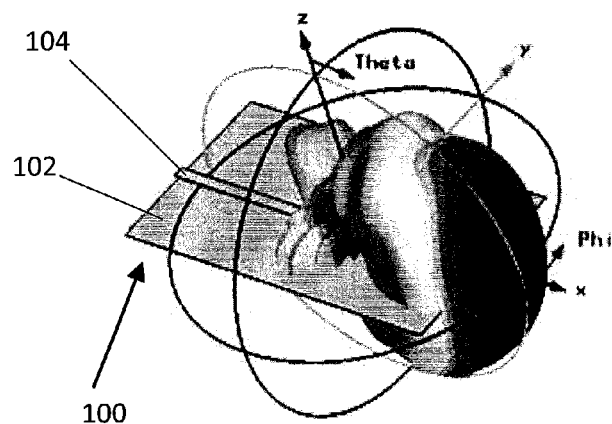
Figure 6D:
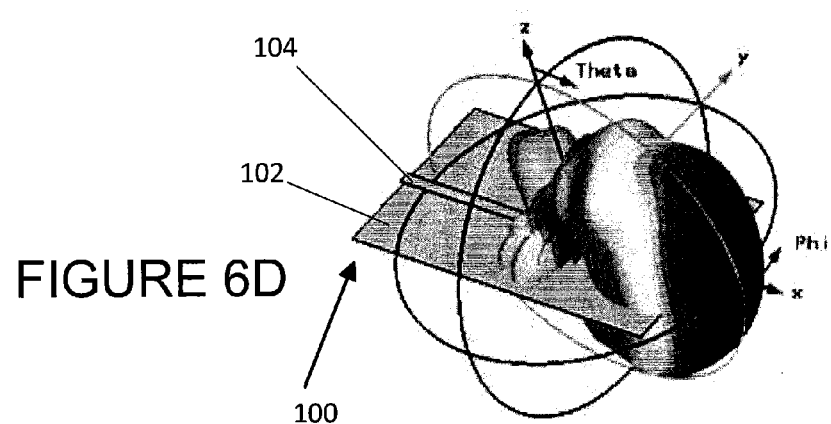

Referring to FIGS. 6B-6D, the radiation patterns at points 1, 2, and 3 respectively of FIG. 6A is illustrated. The radiation patterns at approximately 30 GHz, 33 GHz, and 36 GHz at points 1, 2, and 3 respectively, each span broadly and uniformly around the top edge of the wireless electronic device 100 with few prominent side lobes and little distortion. Although this antenna may be primarily for use as a dual band antenna, the wideband radiation patterns at these additional frequencies provide potential for use of the antenna at one or more additional frequencies in addition to the primary lowband and highband frequencies described herein. Accordingly, the antenna design described herein may provide excellent performance at several frequencies for a variety of extremely high frequencies.

Electromagnetic properties of the described antenna structures may be determined by physical dimensions and other parameters. For example, parameters such as stripline width, stripline positioning, dielectric layer thickness, dielectric layer permittivity, and length of antenna arms, may affect the electromagnetic properties of antenna structures and subsequently the antenna performance.

As described herein, applying an integrated balun in multilayer environment with a stripline results in a compact dual band dipole. The dual band dipole antenna may provide, for example, antenna coverage in the 15 GHz band and the 28-35 GHz band. Both bands provide omnidirectional patterns and may be used in antenna array applications. These structures may be easily integrated into multilayer PCB structures and may be cost efficient to manufacture. The integrated balun may be repeated in an array pattern and configured to receive and/or transmit multiple-input and multiple-output (MIMO) communication and/or 3D MIMO communication. Respective radiation fields formed by the integrated balun structures may additively couple to form an electromagnetic radiation beam for beamforming applications.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A wireless electronic device, comprising:
   a printed circuit board (PCB) comprising first, second, and third conductive layers separated from one another by first and second dielectric layers respectively;
   a stripline in the first conductive layer;
   two highband dipole antenna strips in the second conductive layer; and
   two lowband dipole antenna strips in the third conductive layer,
   wherein the wireless electronic device is configured to resonate at a lowband resonant frequency corresponding to the two lowband dipole antenna strips and resonate at a highband resonant frequency corresponding to the two highband dipole antenna strips when excited by a signal transmitted and/or received though the stripline,
   wherein the second conductive layer is between the first conductive layer that includes the stripline and the third conductive layer that includes the two lowband dipole antenna strips.

2. The wireless electronic device of claim 1, further comprising a balun, wherein the balun comprises:
   a ground plane; and
   a current phase controlling element that is configured to control a phase of a current of the wireless electronic device.

3. The wireless electronic device of claim 1, further comprising:
   a feeding via that electrically connects the stripline to at least one of the highband dipole antenna strips through the first dielectric layer.

4. The wireless electronic device of claim 2, wherein the ground plane and the current phase controlling element are in the second conductive layer.

5. The wireless electronic device of claim 2, wherein the current phase controlling element comprises a first portion and a second portion with a slot therebetween.

6. The wireless electronic device of claim 5, wherein a width of the slot controls the phase of the current of the wireless electronic device.

7. The wireless electronic device of claim 2,
   wherein the stripline comprises a first portion and a second portion, and
   wherein the first portion of the stripline is positioned to overlap the second portion of the current phase controlling element for electromagnetic coupling to form an electromagnetic radiation beam.

8. The wireless electronic device of claim 7, further comprising:
   a feeding via that electrically connects the second portion of the stripline to at least one of the highband dipole antenna strips through the first dielectric layer.

9. The wireless electronic device of claim 2, further comprising:
   an antenna element via that electrically connects the current phase controlling element to at least one of the lowband dipole antenna strips through the second dielectric layer.

10. The wireless electronic device of claim 1,
    wherein a length of one of the lowband dipole antenna strips is approximately 0.25 wavelengths of the lowband resonant frequency, and
    wherein a length of one of the highband dipole antenna strips is approximately 0.25 wavelengths of the highband resonant frequency.

11. The wireless electronic device of claim 2, wherein the stripline is positioned to impedance match the balun.

12. The wireless electronic device of claim 1, wherein the width of the stripline is based on a thickness of the first dielectric layer between the first and second conductive layers.

13. A wireless electronic device, comprising:
a printed circuit board (PCB) comprising first, second, and third layers separated from one another by first and second dielectric layers respectively;
a stripline in the first layer;
a current phase controlling element in the second layer, wherein the second layer is between the first layer and the third layer;
two highband dipole antenna strips in the second layer;
two lowband dipole antenna strips in the third layer;
an antenna element via extending through the second dielectric layer from the current phase controlling element in the second layer to at least one of the lowband dipole antenna strips in the third layer; and
a feeding via extending through the first dielectric layer from the stripline in the first layer to at least one of the highband dipole antenna strips in the second layer.

14. The wireless electronic device of claim 13, further comprising a ground plane in the second layer.

15. The wireless electronic device of claim 13, wherein the current phase controlling element comprises a first portion and a second portion with a slot therebetween.

16. The wireless electronic device of claim 15, wherein a width of the slot controls the phase of the current of the wireless electronic device.

17. The wireless electronic device of claim 13,
wherein the stripline comprises a first portion and a second portion, and
wherein the first portion of the stripline is positioned to overlap the second portion of the current phase controlling element for electromagnetic coupling to form an electromagnetic radiation beam.

18. The wireless electronic device of claim 13,
wherein the wireless electronic device is configured to resonate at a lowband resonant frequency corresponding to the two lowband dipole antenna strips and resonate at a highband resonant frequency corresponding to the two highband dipole antenna strips when excited by a signal transmitted and/or received though the stripline.

19. The wireless electronic device of claim 18,
wherein a length of one of the lowband dipole antenna strips is approximately 0.25 wavelengths of the lowband resonant frequency, and
wherein a length of one of the highband dipole antenna strips is approximately 0.25 wavelengths of the highband resonant frequency.

* * * * *